(12) United States Patent
Silverstein et al.

(10) Patent No.: US 11,789,665 B2
(45) Date of Patent: Oct. 17, 2023

(54) VARIABLE INK SATURATION WITHIN A PRINT JOB

(71) Applicant: International Business Machines Corporation, Armonk, NY (US)

(72) Inventors: Zachary A. Silverstein, Georgetown, TX (US); Tushar Agrawal, West Fargo, ND (US); Trudy L Hewitt, Cary, NC (US); Alan Chung, Hopewell Junction, NY (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/646,874

(22) Filed: Jan. 4, 2022

(65) Prior Publication Data
US 2023/0229365 A1    Jul. 20, 2023

(51) Int. Cl.
*G06F 3/12* (2006.01)
(52) U.S. Cl.
CPC .......... *G06F 3/1208* (2013.01); *G06F 3/1237* (2013.01); *G06F 3/1286* (2013.01)
(58) Field of Classification Search
CPC .... G06F 3/1208; G06F 3/1237; G06F 3/1286; G06T 2207/30144; G06T 2007/30168; G06T 2207/30168; G06K 15/1884; G06V 10/993; G06V 10/98; G07B 2017/00556; H04N 1/00872
See application file for complete search history.

(56) References Cited

U.S. PATENT DOCUMENTS

| | | | | |
|---|---|---|---|---|
| 2002/0140973 A1* | 10/2002 | Imaizumi | ............... | G06F 3/1208 358/1.9 |
| 2004/0042019 A1* | 3/2004 | Moro | ....................... | H04N 1/46 358/518 |
| 2008/0137914 A1* | 6/2008 | Minhas | .............. | H04N 1/00063 382/112 |
| 2009/0284791 A1* | 11/2009 | Osada | ................... | G06F 3/1208 358/1.15 |

(Continued)

FOREIGN PATENT DOCUMENTS

WO    2007035562 A2    3/2007

OTHER PUBLICATIONS

"Barcode", Wikipedia, page last edited on Sep. 22, 2021, 22 pages, <https://en.wikipedia.org/wiki/Barcode>.

(Continued)

*Primary Examiner* — Juan M Guillermety
(74) *Attorney, Agent, or Firm* — Stephen R. Yoder

(57) ABSTRACT

Ink saturation for a print job varies according to prioritized elements identified within a given document or print job. Elements are prioritized according to pre-defined values according to document type and identified elements within the document type. High priority elements of a document are assigned greater ink saturation than lower priority elements of the same document. Automated prioritization is made possible by a crowd-sourced knowledge corpus including pre-defined document types and corresponding elements of the documents. Historic configurations accepted by a user drive a learning process using a feedback loop for refined decision-making as print jobs are submitted for printing.

20 Claims, 4 Drawing Sheets

(56) References Cited

U.S. PATENT DOCUMENTS

| | | | |
|---|---|---|---|
| 2015/0049921 A1* | 2/2015 | Crean | G06V 10/993 382/112 |
| 2015/0062598 A1 | 3/2015 | Barkai | |
| 2017/0330329 A1 | 11/2017 | Nykyforov | |
| 2021/0229461 A1 | 7/2021 | Soh | |
| 2022/0294910 A1* | 9/2022 | Morales | G06F 3/1237 |

OTHER PUBLICATIONS

"Multi-function printer", Wikipedia, page last edited on Sep. 15, 2021, 8 pages, <https://en.wikipedia.org/wiki/Multi-function_printer>.

"OCR: The most important scanning feature you never knew you needed", © 2011 Hewlett-Packard Development Company, L.P, 4 pages, <http://h71036.www7.hp.com/hho/cache/608037-0-0-39-121.html>.

"Optical character recognition", Wikipedia, page last edited on Sep. 16, 2021, 8 pages, <https://en.wikipedia.org/wiki/Optical_character_recognition>.

"Printing According to the Document Type", Canon, 2 pages, <https://oip.manual.canon/USRMA-0637-zz-SS-enUS/contents/SS151_print_041printingaccordingtothedocumenttype.html>.

"QR code", Wikipedia, page last edited on Sep. 13, 2021, 19 pages, <https://en.wikipedia.org/wiki/QR_code>.

Cureton, Adam, "Using QR Codes to Make Presentation Materials More Accessible", Society for Philosophy and Disability, May 12, 2017, 23 pages, <http://societyforphilosophyanddisability.org/2017/05/using-qr-codes-to-make-presentation-materials-more-accessible/>.

Houston et al., "Why printer ink is so expensive", Mar. 2, 2021, 4 pages, Copyright © 2021 Insider Inc., <https://www.businessinsider.com/why-printer-ink-so-expensive-2019-8>.

IBM, "IBM Production Output Management for the Enterprise", © International Business Machines Corporation 2001, G563-0794-00, 2 pages.

* cited by examiner

VARIABLE INK SATURATION WITHIN A PRINT JOB

BACKGROUND

The present invention relates generally to the field of printing digital files, and more particularly to ink saturation levels for a print job.

Optical character recognition or optical character reader (OCR) is the electronic or mechanical conversion of images of typed, handwritten, or printed text into machine-encoded text. The images by originate from the following non-exclusive list of sources: a scanned text document, a photograph of a text document, a photograph of a scene including text on signs and billboards, or an image including subtitle text.

QR (quick response) code is a type of matrix barcode (or two-dimensional barcode). A QR code consists of black squares arranged in a square grid on a white background. The QR code is read by an imaging device such as a camera and processed using Reed-Solomon error correction until the image can be appropriately interpreted. (Note: the term(s) "QR CODE" and/or "QUICK RESPONSE CODE" may be subject to trademark rights in various jurisdictions throughout the world and are used here only in reference to the products or services properly denominated by the marks to the extent that such trademark rights may exist.)

A barcode is a method of representing data in a visual, machine-readable form. Barcodes initially represented data by varying the widths and spacings of parallel lines. These types of barcodes, commonly referred to as linear or one-dimensional codes, can be scanned by special optical scanners called barcode readers.

A print management system is a package manager system which consists of a specific collection of software tools that automates the process of installing, upgrading, configuring, and controlling the intercommunicating components based on software forming the printer system and providing its function and feature capabilities.

SUMMARY

In one aspect of the present invention, a method, a computer program product, and a system includes: identifying a set of elements of a document based on a document type associated with the document; determining a print quality level for each element of the document; determining a print quality attribute for printing each identified element of the document based, at least in part, on the print quality level assigned to each element; responsive to determining the print quality attributes, automatically adjusting one or more default print settings of a print job for the set of elements according to the print quality attributes; and sending the print job to a selected printer for applying specified print quality attributes while printing the document.

In another aspect of the present invention, a method, a computer program product, and a system includes determining print quality scores for the document based on predicted needs of a user. The print quality scores define print quality level settings for the print job. The predicted needs of the user are based on how long the user will maintain the printed document such that higher print quality scores are assigned to documents having a longer maintenance period In yet another aspect of the present invention, a method, a computer program product, and a system includes identifying the selected printer from a set of printers based on printer capability of rendering the set of elements according to the specified print quality attributes.

DETAILED DESCRIPTION

Figure 1:
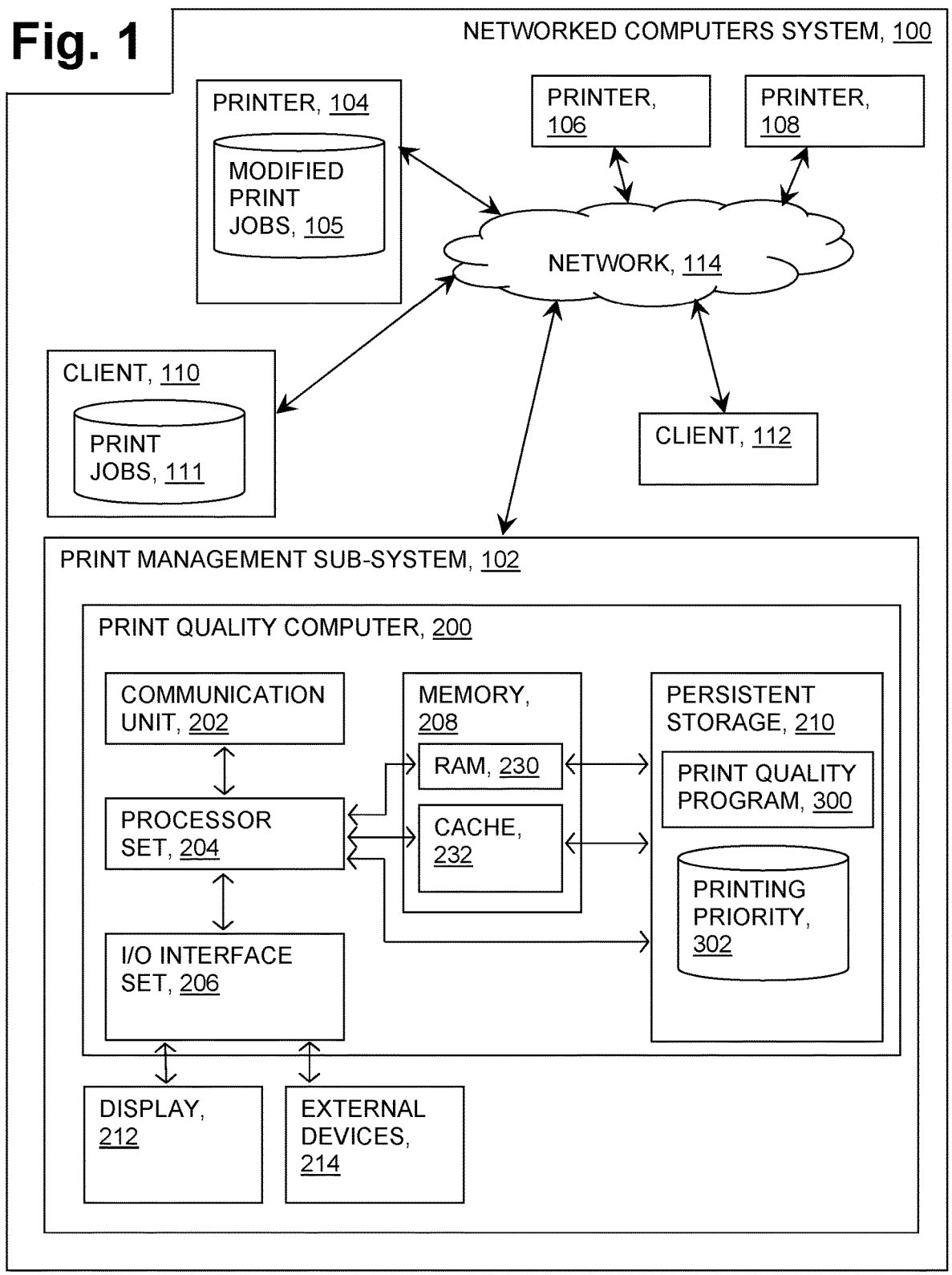
FIG. 1 is a schematic view of a first embodiment of a system according to the present invention.

Ink saturation for a print job varies according to prioritized elements identified within a given document or print job. Elements are prioritized according to pre-defined values according to document type and identified elements within the document type. High priority elements of a document are assigned greater ink saturation than lower priority elements of the same document. Automated prioritization is made possible by a crowd-sourced knowledge corpus including pre-defined document types and corresponding elements of the documents. Historic configurations accepted by a user drive a learning process using a feedback loop for refined decision-making as print jobs are submitted for printing. The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium, or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network, and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating various portions of networked computers system 100, in accordance with one embodiment of the present invention, including: print management sub-system 102; printer sub-systems 104, 106, 108; modified print jobs store 105; client sub-systems 110, 112; print jobs store 111; communication network 114; print quality computer 200; communication unit 202; processor set 204; input/output (I/O) interface set 206; memory device 208; persistent storage device 210; display device 212; external device set 214; random access memory (RAM) devices 230; cache memory device 232; print quality program 300; and printing priority store 302.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, and memory cards. Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Print quality program 300 operates to identify components of a document for enhanced or diminished print quality. A print job for the document is modified to direct varied quality of printing based on prioritized printing scheme directed to the various components of the document according to characteristics of the document including document type and temporal settings. Prioritizing of the print quality is based on learned prioritization from a crowd-sourced data corpus and user-specific preferences. User preferences are learned by a feedback loop and by evaluating user-derived changes to proposed printing schemes for various document types.

As the term in used herein a print job is a single queueable print system object that represents a set of print elements or artifacts of one or more documents, the print elements needing to be rendered and/or transferred to a printer. The term document is not intended to refer only to text documents but should broadly apply to a set of elements to be rendered on a printed medium. Throughout this detailed description the term document is used in the broader context.

Some embodiments of the present invention recognize the following facts, potential problems and/or potential areas for improvement with respect to the current state of the art: (i) users continue to print varying types of content such as coupons and boarding passes; (ii) conventional smart printers only allow for adjusting the print quality setting for an entire print job; (iii) when an entire print job is printed using high print quality when only certain aspects, or elements, of the printed material requires a higher print quality, it is likely that over 75% of the ink used for the print job is wasted; and/or (iv) when fast-print settings, which save ink usage, are used for all content in a print job including barcodes and/or QR codes, it is common for the barcode or QR code to be unreadable when used.

A printing protocol that evaluates a typical printing process and augments the process with an intelligent workflow pertaining to ink saturation of the printed medium. The printing protocol consists of a combination of a print management system with a trained AI (artificial intelligence) understanding memory and machine learning with the ability to make printing decisions based on historical references when preparing or modifying a print job.

Some embodiments of the present invention are directed to providing intelligence and overall control of the printing tasks. For example, for a coupon or boarding pass sent to a printer, the system dynamically detects or recognizes a barcode or QR code as an important element or feature on the document and applies a higher print quality to those elements, using grey-scale or fast-print options having a lower print quality for other, less important portions of the document. Alternatively, the smart print system identifies an appropriate printer to receive the print job so that important elements are printed according to their quality requirements, including the use of color ink and the status of ink supply for the various printers.

Some embodiments of the present invention are directed to applying the appropriate print quality to ensure effectiveness of its usage. By applying a higher print quality on important elements of a print job, such as a barcode or QR code, the ease and effectiveness of reading the important elements is ensured. As a result, better accuracy and efficiency of use is possible for the important element. Further, less printer ink is used to render the rest of the content of the print job.

Some embodiments of the present invention are directed to producing cost-effective printed matter by identifying targeted, higher print quality areas of focus. The varying print quality on a given set of elements based on usage or element category with a higher printer quality for specific elements.

For example, some embodiments of the present invention may apply a higher print quality to specified content of a boarding pass including: the QR code, the boarding gate number, and departure time while applying a lower print quality to the remaining content of the boarding pass. The high-quality image of the QR code increases the readability and usability of the boarding pass at a lower cost than if the entire content of the boarding pass print job were printed in high quality.

According to some embodiments of the present invention, the same printer ink cartridge is used to print more artifacts of a print job with high quality print configuration where it matters and for less cost of ink because other artifacts of the print job are printed in lower quality print configurations. Improved readability when the printed boarding pass is scanned upon boarding a flight at an optimal amount of ink. In addition to optimizing ink usage with a minimalized cost, some embodiments of the present invention organize multiple content elements to be printed for maximum paper usage using image sizing and scaling.

Some embodiments of the present invention are directed to a method comprising: (i) training AI models to recognize certain elements of a print job including: barcodes, images, embedded text, document fields, keywords, entity families; (ii) developing a prioritization database cross-referencing certain elements with specified quality controls including DPI values, ink usage values, and ink color values; (iii) user selection of a print job; (iv) identify a print job type based on characteristics of the selected print job including document type and/or element type; (v) determine an appropriate printing scheme for the print job type; (vi) send the selected print job and printing scheme to a designated printer.

According to some embodiments of the present invention, when a user chooses to print something (i.e. store coupons, boarding pass, invoice, etc.), a smarter print system included and supported by operating systems and having appropriate capabilities incorporated into the software such as word processors and document processors assumes that the setup/configuration has been completed. Further, the device from which the user is printing (e.g. smartphone, laptop, and tablet.) is connected to the network and connected to the internet to reach the crowdsourced data corpus that has been enriched dynamically and ongoing through thousands of cycles of shared usage with a larger population.

From the chosen device, a user may select one or many documents for the print job to be sent to a selected printer. The user may select a default setting that detects content of the selected documents using saved profiles and/or configurations for detected content types selected for printing.

According to some embodiments of the present invention, print jobs may be adjusted, automatically or manually, using advanced features, for example: (i) crop/resize; (ii) select/deselect high quality objects; (iii) print quality settings such as fast-print, greyscale, and high-quality; (iv) configurations to customize item type or content type profiles; and/or (iv) organizing content to be printed using snap-to-grid or align.

According to some embodiments of the present invention, a user may select a print command to proceed with the print job or a preview command to confirm settings and or arrangements of content and aspects selected for high quality print settings. The smart printing system described herein may be activated to make default arrangements based on the weight/score setup using various attributes, user profile, and/or print job type or document/element category. Further, the smart printing system may select a default printer, a printer designated by the print command, or a particular printer having capability to print according to the print setting selected by the user. When activated, the smart print system uses the crowdsourced data corpus and default and/or learned document formats such as identification of barcodes, QR codes, and/or keywords (e.g. invoice number, confirmation number) to apply pre-defined print quality to the different elements and/or areas/regions of a document.

According to some embodiments of the present invention, the smart print system may search for a matching document based on template detection. Alternatively, the smart print system searches by using known document processing techniques, OCR techniques, and/or object/image recognition techniques to apply a specified print quality to the elements of the print job. Quality-required elements are prioritized or deprioritized based on a default rating with prioritization affecting aspects of print quality such as DPI, size, color, and/or font characteristics.

According to some embodiments of the present invention, the print job is sent to the print when the user selects the print command. Alternatively, the processing of the print job including some or all of the smart print actions stated above are performed by the printer upon receipt of a print job from a particular user. The print quality is adjusted automatically according to user-profile guidance including optional use of the crowdsourced data corpus with preset priorities to generate a modified print job. However, in this example, the smart print system generates the modified print job and sends it to the printer for printing. The outcome is that the document prints with different qualities of print according to prioritized sections within the document.

Figure 2:
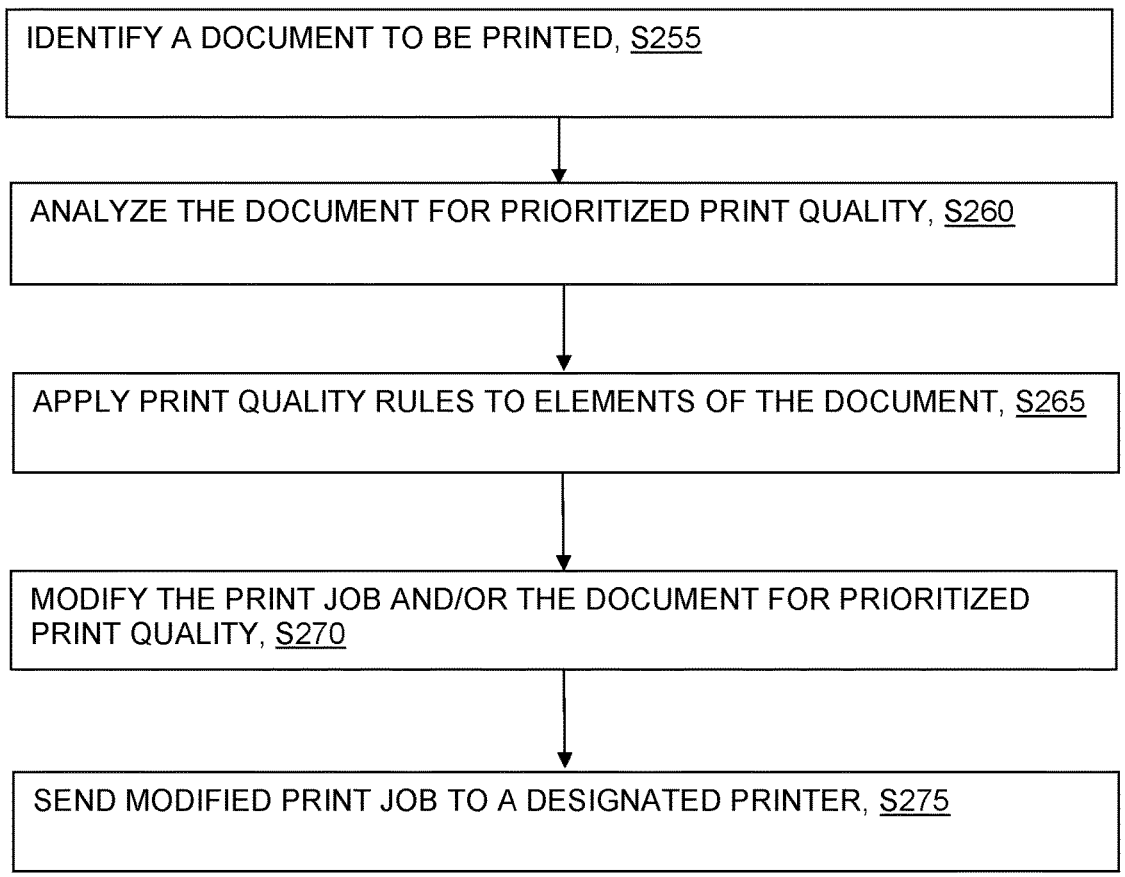
FIG. 2 is a flowchart showing a method performed, at least in part, by the first embodiment system.
Figure 3:
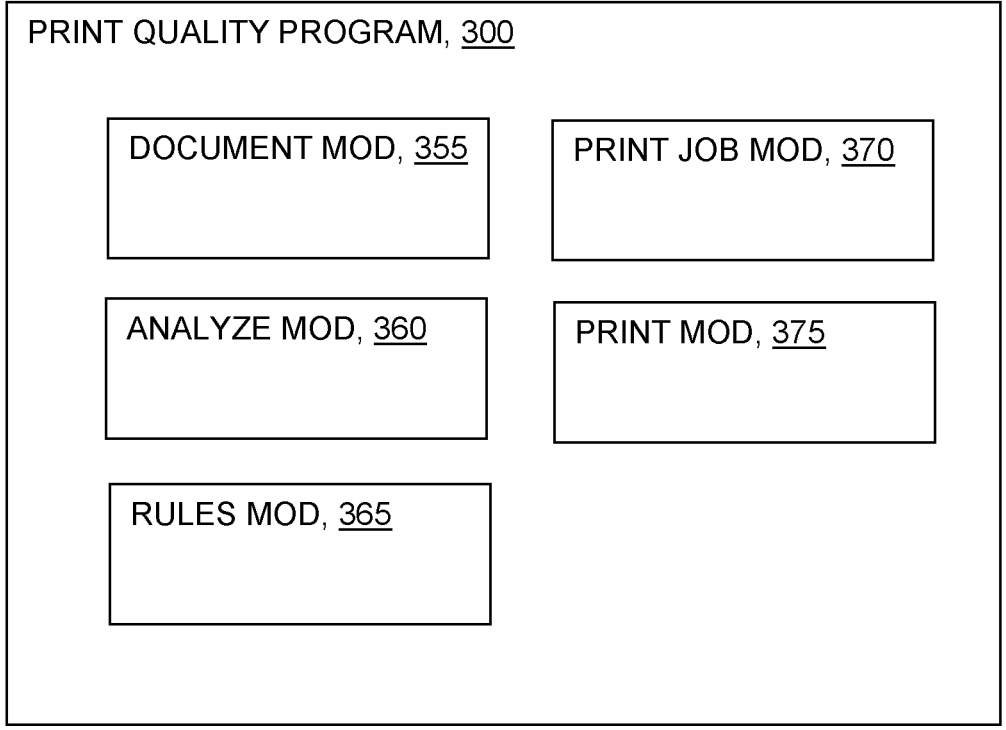
FIG. 3 is a schematic view of a machine logic (for example, software) portion of the first embodiment system.

FIG. 2 shows flowchart 250 depicting a first method according to the present invention. FIG. 3 shows program 300 for performing at least some of the method steps of flowchart 250. This method and associated software will now be discussed, over the course of the following paragraphs, with extensive reference to FIG. 2 (for the method step blocks) and FIG. 3 (for the software blocks).

Processing begins at step S255, where document module ("mod") 355 identifies a document to be printed. In this example, a document is identified when a print job is submitted for printing. A bitstream or application-level representation of the print job is retrieved to identify the document. Alternatively, a document is received from a user for the purpose of printing the document according to certain specified rules. Alternatively, identification of the document is responsive to storing the document in a designated storage location for processing in advance of printing.

Processing proceeds to step S260, where analyze mod 360 analyzes the document for prioritized print quality. The identified document is analyzed for certain characteristics or features to determine what elements are present for prioritized print quality. In this example, the document type is identified, and specified elements are determined to be present based on the type of document. For example, an invoice-type document is identified during analysis and elements including invoice number, total amount, and payee are determined to be present within the invoice-type document. State of the art tools are used to identify elements for print quality determination, such has natural language processing. Machine learning tools, as discussed more below, also play a role in analyzing the document identified in step S255 by learning user preferences for prioritized printing of various documents printed at previous times.

For a given document type, certain elements are pre-defined as having higher priority than others. Also, certain elements are pre-defined as having lower priorities and/or as not requiring printing at all. Alternatively, for an unknown document type, analyze mod 360 uses character recognition and image analysis techniques to identify pre-defined element types, such as barcodes, keywords, and other areas of interest for processing.

Processing proceeds to step S265, where rules mod 365 applies print quality rules to elements of the document. When the pre-defined elements are identified during analysis, each element is cross-referenced to a print quality rule. Because the elements identified are based on pre-defined records of elements, no unknown elements are addressed. Any remaining portions of the identified document are printed according to a default setting. In this example, elements are identified for print quality adjustment including: (i) invoice number, (ii) total amount, and (iii) payee name. Each of these elements is assigned a high-quality print configuration in grayscale according to their corresponding print quality rules. Further, areas of lower-quality printing are identified by elements including: (i) the user's own mailing address; (ii) correspondence section, and (iii) header.

Processing proceeds to step S270, where print job mod 370 modifies the print job and/or the document for prioritized print quality. After determining what rules to apply to the identified elements of the document to be printed, the print job is modified to ensure compliance with the print rules. Alternatively, or additionally, the document being printed is modified to show certain identified elements in bold font and/or larger font and still other identified elements are modified in the document with lighter lines and/or smaller font. In this example, where the print job is identified and the corresponding document is analyzed, the identified print job is modified to generate a modified print job. Alternatively, the document that is identified in step S255 is the basis for preparing a print job according to the print quality rules. In that way, a print file is created, such as a prn file, for the identified document.

Processing ends at step S275, where print mod 375 sends the modified print job to a designated printer for rendering the identified document. Many of the steps discussed above may be performed automatically upon certain triggers such as the storing of the document to trigger the processing of an appropriate print job for the document. Again, in this step, automatic processing may occur. When a print job is identified and a modified print job is created, the modified print job may be automatically sent to an appropriate printer. The determination of which printer to use may be made in view of the requirements of the modified print job. That is, the modified print job may no longer be appropriate for the originally designated printer to receive. In that case, an alternative printer is identified to receive the modified print job.

Further embodiments of the present invention are discussed in the paragraphs that follow and later with reference to FIG. 4.

According to some embodiments of the present invention an opt-in user consent is obtained for shared corpus enrichment. The user opts in to allow collection of information about the content of the print job. The user will have the opportunity to agree to have the content scrubbed for any personal data and have the content applied to a smart, crowdsourced system that aids in the future determination of content quality and usability infusion to aid in the future endeavors to make the printer smarter by enriching the corpus of knowledge to pertaining to what is critical to the user pertaining to print quality selections.

Administrators of the smart printing system include manually and/or automatically trained elements and/or documents and their corresponding default priority rating. Training includes: (i) element recognition in conjunction with machine learning to capture barcodes, images, and embedded text; (ii) templated documents to capture any document templates with variable text or inputs; (iii) high priority items such as specific keywords or entity families; and (iv) prioritization of print quality such as a DPI value, ink usage value, and ink color value.

Determining what content in a print job should be printed in high quality invokes the use of various types of enabling art including: (i) optical character recognition; (ii) QR code; (iii) barcode; and/or (iv) print management systems.

Some embodiments of the present invention are directed to printing a collection of coupons having barcodes with snap-to-grid using higher print quality just for barcode while using grayscale and/or draft print quality for the remainder of the print job.

Some embodiments of the present invention are directed to generating a boarding pass print job having a QR code by applying high quality print to the QR code while using draft or fast-print quality for the remainder of the boarding pass content.

According to some embodiments of the present invention, the use of grayscale is balanced with the use of full color for documents having certain critical elements that print in color.

Some embodiments of the present invention are directed to printing hotel reservation confirmations such that high print quality is used according to keywords including, for example, confirmation number and date of arrival.

Some embodiments of the present invention are directed to purchase order invoice print jobs where high print quality is applied to the documents according to pre-defined fields including, for example, invoice date, invoice number, and total amount.

Some embodiments of the present invention are directed to printing map directions such that higher print quality is applied to certain elements along the directed route (for example, exit numbers, estimated travel times, landmarks, and/or major route numbers/names), while lower print quality is used for elements outside of the directed route. Alternatively, a target map area is printed with higher print resolution or quality and images outside of the target map area are printed with lower print resolution or quality.

Some embodiments of the present invention are directed to printing recipes such that higher resolution printing is applied to a specified section containing, for example, the recipe. Further, moderate resolution printing is applied to another specified section of interest but not as high importance as the recipe. Still further, very low-resolution printing is applied to yet another specified section that is of no importance at all.

Some embodiments of the present invention are directed to local corpus enrichment via a feedback step. The smart print system collects valuable feedback from the user pertaining to the overall quality of the print job elements generated by the printer. The qualified areas within the document are quantified and feedback is requested. A user marks certain pages or elements as higher quality at time of printing. This may be performed by the user manually or parameters such as, but not limited to, accessibility features are employed.

For example, an accessibility feedback loop may be requested to enrich the corpus of knowledge for printed content. The feedback step serves in one aspect to make the document easier to consume including the user of higher printing quality. QR codes are known to make presentation materials more accessible, so further improving QR code recognition with targeted print quality supports accessibility of the document as well as reduced printer ink usage. Further, any feature of a print job that aids the accessibility of the document may be marked as a critical print item to prioritize for high quality printing.

Some embodiments of the present invention are directed to temporal-based usage patterns to determine quality of print for a given print job. For example, the user can provide the smart print system with a planned usage metric that will allow the system to aid in the quality selection based on planned retainment of the document. Some documents might have no priority elements driving high quality printing, but a user may want to retain a printed article/item for a long time, which may necessitate higher quality printing of aspects of the printed item. In this example, the user provides the system with a temporal projection for consumption of the document. In that way, usage time and/or usage duration metrics serve as a means to control overall quality of certain parts of the document.

Some embodiments of the present invention are directed to learning new document types with the functionality to generate a corresponding template based on user input from a selectable list of previously processed document types. By flagging or detecting user-defined conditions by document type such as past due or expiration dates, a corresponding warning message is pushed to the user. Default behavior may be continued by user preference according to a response to the notice.

Some embodiments of the present invention are directed to identifying areas of differing importance levels for the application of appropriate printing quality. The system allows a higher quality of printing for the targeted areas of printed material while using a more efficient, but equally appropriate quality of printing for the remainder of the printed material.

Some embodiments of the present invention are directed to employing artificial intelligence (AI) techniques to assign a percentage importance or other weighting/score to different areas of the printed material based on projected interests or needs of a specified user, determined context of the printed material, and other attributes such as target audience.

Table 1, below, illustrates an example decision table for prioritized printing of elements in a print job according to an important score.

TABLE 1

Example Decision Table for Ink Saturation.

| Importance of Element | Print Quality | Ink Saturation |
|---|---|---|
| High Score | High Quality | Strong Saturation |
| Moderate Score | Medium Quality | Moderate Saturation |
| Low Score | Draft Quality | Low Saturation |
| None | Do not print | No Saturation |

Some embodiments of the present invention are directed to modifying default ranges associated with quality of printing during print preview. Manual changes to the automatic selection drive learning for future printing adjustments and/or priority selections. Some embodiments of the present invention generate a standard print document (e.g., prn file) that can be consumed printers without much hassle.

Figure 4:
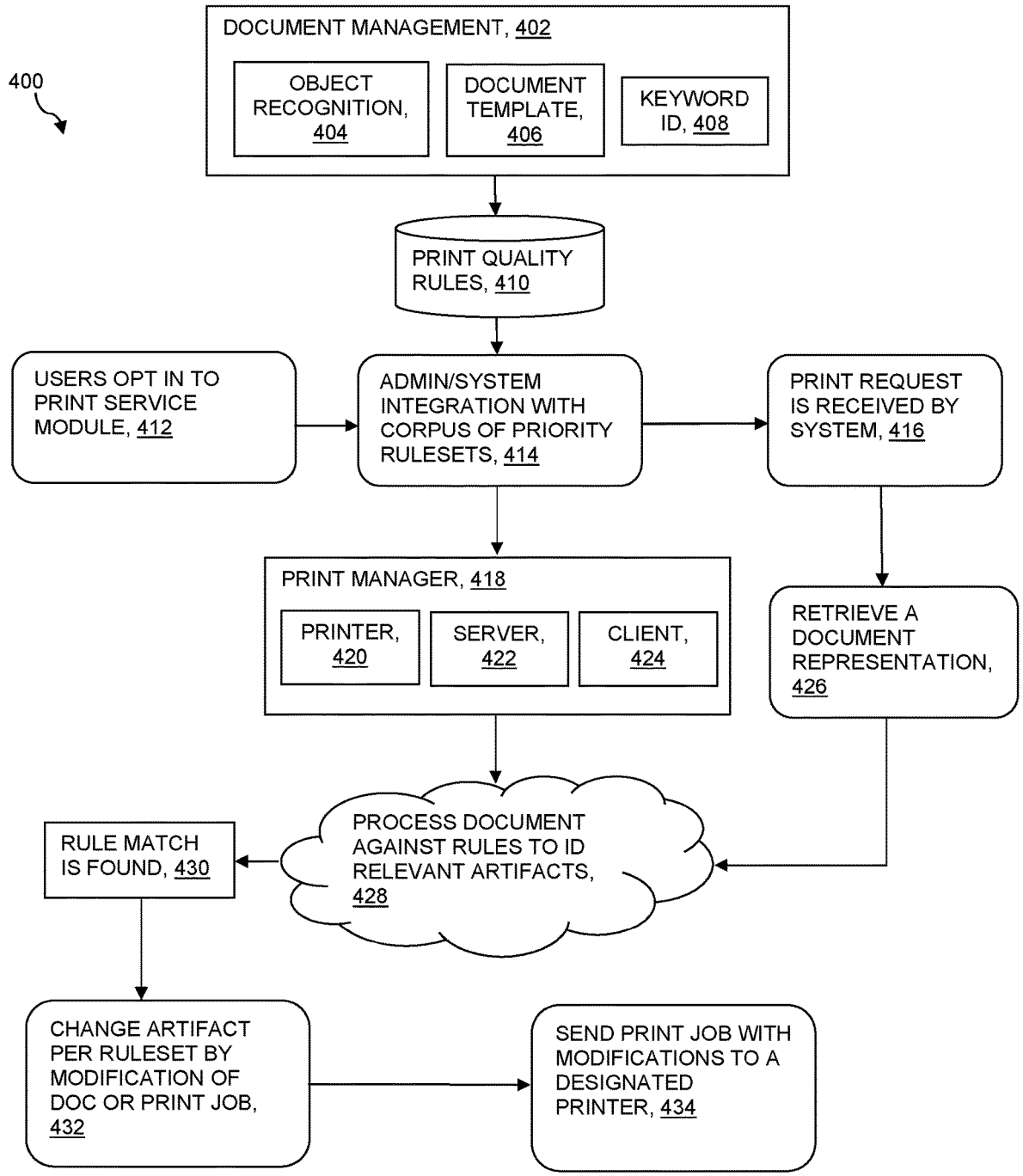
FIG. 4 is a system view of a second embodiment of a system according to the present invention performing a method as indicated within the system view.

FIG. 4 shows print quality computers system 400 depicting a second method and corresponding system according to an embodiment of the present invention. This method and associated software will now be discussed, over the course of the following paragraphs, with extensive reference to FIG. 4 for the method steps. A program performing the steps discussed below may be implemented in networked computers system 100 (FIG. 1) similar to print quality program 300.

Processing begins at document management sub-system 402, where object recognition engine 404, document template engine 406, and keyword identification engine 408 operate with crowd-sourced document data to create print quality rules 410 for reference when processing print jobs. It should be noted that users are expected to opt into the print quality service 412 prior to sharing document data with document management sub-system 402.

Processing proceeds to corpus integration 414 where the print quality system integrates with the crowd-sourced document corpus having prioritization rules associated with a variety of documents including images, word processing files, and other printable objects.

Processing proceeds to the system receiving a request 416 from a user to print a document. Upon receipt of the request, the bytestream or application-level representation of the document is retrieved 426. Printing is managed by print manager 418 in communication with printer module 420, server module 422, and client module 424 to ensure appropriate handling of the print request. The printer module support determining which printer is capable of performing the print job and the client module includes client-specific requirements related to print jobs.

Processing proceeds to the system processing the identified document from the print request in view of the rule sets available in print quality rules store 410. Artifacts within the document to be printed are identified for individual processing according to the print quality rules 428. For each artifact matching a rule 430, the artifact is modified 432 by means of document modification and/or print request specifications.

Processing ends with the system sending the designated printer the updated print request with identified artifacts prioritized, or deprioritized, according to the print quality rules 410 that change the print job specifications and/or options 434.

Some embodiments of the present invention are directed to applying varying quality of printing to elements of a print job such that targeted aspects are printed in higher quality than other aspects. Further, the print job or document to be printed is broken down into multiple sections or areas for specific focus-driven print quality.

Some embodiments of the present invention are directed to the usage and optimization of a multi-function printer. Some embodiments of the present invention do more than apply various print qualities to print jobs based on the type of document to be printed. Some embodiments of the present invention are directed to varying the printer quality for specified elements, areas, and/or requirements within a single document being printed.

Some embodiments of the present invention are directed to an artificial intelligence-based solution that learns over time to automatically identify and optimize usage of printer ink. An importance score is assigned to certain elements of a print job to define ink saturation levels. Further, pre-defined print quality is based on usage/preferences of a user. A standard print file is generated with defined print quality areas.

Some embodiments of the present invention are directed to the features of identifying areas of different importance levels to apply appropriate printing quality employ and employing artificial intelligence (AI) techniques to assign an importance weighting/score to different areas of the document based on projected interest/needs of a user, context of the document and other attributes.

Some embodiments of the present invention are directed to dynamically altering a print quality of respective portions of a document by performing a process including: (i) determining a print quality priority level associated with respective areas of a document based, at least in part, on a type of object and/or information included in a respective area of the document; (ii) determining one or more print quality attributes (e.g., dots per inch (DPI), ink usage value, ink color value) for printing each respective area of the document based, at least in part, on the print quality level assigned to the respective area of the document; (iii) identifying areas of different importance levels to apply appropriate printing quality employ and employing artificial intelligence (AI) techniques to assign an importance weighting/score to different areas of the document based on projected interest/needs of a user, context of the document and other attributes; (iv) automatically adjusting one or more print settings for each respective area of the document based on the one or more determined print quality attributes associated with the respective area of the document; and (v) printing the document based on the one or more adjusted print settings associated with each respective area of the document.

Some embodiments of the present invention may include one, or more, of the following features, characteristics and/or advantages: (i) invokes a range of enhanced AI features and functions to help reduce the usage cost of printer ink to enable printers to use different print qualities within a single printed sheet based on importance to the user; (ii) in addition to reducing the cost of conventional printing, the negative impact that printing has on our environment is reduced; (iii) uses less printer ink while improving the usability and visual acuity of the documents being printed; (iv) produces higher quality printing for barcode, QR code, reservation number, confirmation number, and boarding passes; (v) provides default printing configurations for coupons, boarding passes, reservations, receipts, invoices, and purchase orders; (vi) provides a preview showing print layout to allow for reconfiguration of print objects or page placement based paper size with features including: maximize use of paper size or printable area, snap-to-grid alignment of images by same-size approach or by best-fit approach (e.g. coupons to be cut, boarding pass to be folded, PO for filing); and/or (vii) customizable templates/profiles for boarding passes, coupons, invoices, receipts, and sales orders.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

What is claimed is:

1. A computer-implemented method comprising:
identifying a template corresponding to a document type, the template including document elements and assigned print quality levels of the document elements;
identifying a set of elements of a document of a print job by matching the document elements of the template to the document, the document type corresponding to the document;
determining print quality levels for the set of elements of the document based on the assigned print quality levels as defined by the template;
determining print quality attributes for printing the set of elements of the document based, at least in part, on the determined print quality levels for the set of elements;
responsive to determining the print quality attributes, automatically adjusting one or more default print settings of the print job for the set of elements of the document according to the print quality attributes; and
sending the print job to a selected printer for applying the determined print quality attributes while printing the document.

2. The computer-implemented method of claim 1, wherein:
the set of elements are further identified based on a set of document characteristics including keywords within the document.

3. The computer-implemented method of claim 1, further comprising:
determining print quality scores for the document based on predicted needs of a user who submitted the print job including the document;
wherein:
print quality scores further defining print quality attributes for the print job.

4. The computer-implemented method of claim 3, wherein:
the predicted needs of the user are based on how long the user will maintain the printed document such that higher print quality scores are assigned to documents having a longer maintenance period.

5. The computer-implemented method of claim 1, further comprising:
identifying the selected printer from a set of printers based on printer capability of rendering the set of elements according to the specified print quality attributes.

6. The computer-implemented method of claim 1, further comprising:
identifying the document upon submission of the document into a print job queue; and
determining the document type corresponding to the document with reference to a set of pre-defined document types.

7. The computer-implemented method of claim 1, wherein the print quality attribute for a first element of the set of elements is to not use any ink to print the first element.

8. The computer-implemented method of claim 1, wherein:
the print quality attributes include dots per inch (DPI), ink usage value, and ink color value.

9. A computer program product comprising a computer-readable storage medium having a set of instructions stored therein which, when executed by a processor, causes the processor to perform a method comprising:
identifying a template corresponding to a document type, the template including document elements and assigned print quality levels of the document elements;
identifying a set of elements of a document of a print job by matching the document elements of the template to the document, the document type corresponding to the document;
determining print quality levels for the set of elements of the document based on the assigned print quality levels as defined by the template;
determining print quality attributes for printing the set of elements of the document based, at least in part, on the determined print quality levels for the set of elements;
responsive to determining the print quality attributes, automatically adjusting one or more default print settings of the print job for the set of elements of the document according to the print quality attributes; and
sending the print job to a selected printer for applying the determined print quality attributes while printing the document.

10. The computer program product of claim 9, wherein:
the set of elements are further identified based on a set of document characteristics including keywords within the document.

11. The computer program product of claim 9, further causing the processor to perform a method comprising:
determining print quality scores for the document based on predicted needs of a user who submitted the print job including the document;
wherein:
print quality scores further defining print quality attributes for the print job.

12. The computer program product of claim 11, wherein:
the predicted needs of the user are based on how long the user will maintain the printed document such that higher print quality scores are assigned to documents having a longer maintenance period.

13. The computer program product of claim 9, further causing the processor to perform a method comprising:
identifying the selected printer from a set of printers based on printer capability of rendering the set of elements according to the specified print quality attributes.

14. The computer program product of claim 9, further comprising:
identifying the document upon submission of the document into a print job queue; and
determining the document type corresponding to the document with reference to a set of pre-defined document types.

15. A computer system comprising:
a processor set; and
a computer readable storage medium;
wherein:
the processor set is structured, located, connected, and/or programmed to run program instructions stored on the computer readable storage medium; and
the program instructions which, when executed by the processor set, cause the processor set to perform a method comprising:
identifying a template corresponding to a document type, the template including document elements and assigned print quality levels of the document elements;
identifying a set of elements of a document of a print job by matching the document elements of the template to the document, the document type corresponding to the document;

determining print quality levels for the set of elements of the document based on the assigned print quality levels as defined by the template;

determining print quality attributes for printing the set of elements of the document based, at least in part, on the determined print quality levels for the set of elements;

responsive to determining the print quality attributes, automatically adjusting one or more default print settings of the print job for the set of elements of the document according to the print quality attributes; and sending the print job to a selected printer for applying the determined print quality attributes while printing the document.

16. The computer system of claim 15, wherein:

the set of elements are further identified based on a set of document characteristics including keywords within the document.

17. The computer system of claim 15, further causing the processor to perform a method comprising:

determining print quality scores for the document based on predicted needs of a user who submitted the print job including the document;

wherein:

print quality scores further defining print quality attributes for the print job.

18. The computer system of claim 17, wherein:

the predicted needs of the user are based on how long the user will maintain the printed document such that higher print quality scores are assigned to documents having a longer maintenance period.

19. The computer system of claim 15, further causing the processor to perform a method comprising:

identifying the selected printer from a set of printers based on printer capability of rendering the set of elements according to the specified print quality attributes.

20. The computer system of claim 15, further comprising:

identifying the document upon submission of the document into a print job queue; and determining the document type corresponding to the document with reference to a set of pre-defined document types.

* * * * *